US012078322B1

(12) United States Patent
Li

(10) Patent No.: US 12,078,322 B1
(45) Date of Patent: Sep. 3, 2024

(54) LIGHT-EMITTING ASSEMBLY AND LIGHTING DEVICE

(71) Applicant: Shiwen Li, Shenzhen (CN)

(72) Inventor: Shiwen Li, Shenzhen (CN)

( * ) Notice: Subject to any disclaimer, the term of this patent is extended or adjusted under 35 U.S.C. 154(b) by 0 days.

(21) Appl. No.: 18/433,712

(22) Filed: Feb. 6, 2024

(51) Int. Cl.
*F21V 15/01* (2006.01)
*F21Y 103/10* (2016.01)
*F21Y 115/10* (2016.01)

(52) U.S. Cl.
CPC .......... *F21V 15/01* (2013.01); *F21Y 2103/10* (2016.08); *F21Y 2115/10* (2016.08)

(58) Field of Classification Search
CPC ... F21V 15/01; F21Y 2103/10; F21Y 2115/10
See application file for complete search history.

(56) References Cited

U.S. PATENT DOCUMENTS

| | | | | |
|---|---|---|---|---|
| 8,360,599 | B2 * | 1/2013 | Ivey | F21V 29/70 362/225 |
| 8,641,229 | B2 * | 2/2014 | Li | F21V 23/06 362/225 |
| 9,115,858 | B2 * | 8/2015 | Levante | F21V 23/06 |
| 9,255,668 | B2 * | 2/2016 | Ye | F21V 15/01 |
| 2013/0094224 | A1 * | 4/2013 | Miyatake | F21V 21/02 362/363 |
| 2015/0117001 | A1 * | 4/2015 | Fan | H05K 3/10 29/850 |
| 2015/0276139 | A1 * | 10/2015 | Rowlette, Jr. | F21V 19/003 362/249.06 |
| 2018/0031184 | A1 * | 2/2018 | Yingchun | H05B 45/395 |
| 2019/0195439 | A1 * | 6/2019 | Rieder | H01L 21/4828 |
| 2020/0109828 | A1 * | 4/2020 | Tolen | F21V 29/83 |

* cited by examiner

*Primary Examiner* — Tsion Tumebo
(74) *Attorney, Agent, or Firm* — Daniel M. Cohn; Howard M. Cohn

(57) ABSTRACT

A light-emitting assembly and a lighting device are provided. The light-emitting assembly includes a transparent sleeve, an elastic support component, and a light strip. An accommodating cavity is defined in the transparent sleeve. The elastic support component is located in the accommodating cavity. The light strip is located in the accommodating cavity, the light strip includes a circuit board and at least one light source, the elastic support component is disposed on a first side of the circuit board in a thickness direction of the circuit board for supporting the circuit board, and the at least one light source is disposed on a second side of the circuit board facing away from the elastic support component. The light-emitting assembly and the lighting device are not easy to be broken and damaged.

19 Claims, 7 Drawing Sheets

LIGHT-EMITTING ASSEMBLY AND LIGHTING DEVICE

TECHNICAL FIELD

The present disclosure relates to a technical field of light emission, and in particular to a light-emitting assembly and a lighting device having the same.

BACKGROUND

Light strips are formed by welding LED lamps on strip-shaped circuit boards through using special processing technologies and are capable of connecting with power supply to emit light. The light strips are capable of emitting light and shaped as strips, thereby getting the name. Nowadays, the light strips are widely applied to building outer portions, bridges, guardrails, hotels, gardens, etc., and are used for decoration and illumination.

Conventional light strips are easily broken and damaged, which are poor in reliability, thereby resulting in poor user experience.

SUMMARY

Regarding above problems, it is necessary to provide a light-emitting assembly which is not easy to be broken and damaged and a lighting device having the same.

The present disclosure provides a first embodiment of the light-emitting assembly, including a transparent sleeve, an elastic support component, and a light strip. An accommodating cavity is defined in the transparent sleeve. The elastic support component is located in the accommodating cavity. The light strip is located in the accommodating cavity, the light strip includes a circuit board and at least one light source, the elastic support component is disposed on a first side of the circuit board in a thickness direction of the circuit board for supporting the circuit board, and the at least one light source is disposed on a second side of the circuit board facing away from the elastic support component.

Furthermore, the transparent sleeve is of a hollow structure having an open end and a closed end, the elastic support component and the light strip are both located in the transparent sleeve, and the circuit board passes through the open end of the transparent sleeve to be electrically connected to a connector.

Furthermore, the transparent sleeve is of a hollow structure having two open ends, the elastic support component and the light strip are both located in the transparent sleeve, and the circuit board passes through the two open ends of the transparent sleeve to be respectively electrically connected to connectors.

Furthermore, the circuit board includes a main body and circuits, and the circuits are disposed on one side or two opposite sides of the main body in the thickness direction of the circuit board.

Furthermore, two sides of the elastic support component in a width direction of the circuit board abut against a cavity wall of the accommodating cavity.

Furthermore, a cavity wall surface of the accommodating cavity facing the at least one light source is spaced apart from the at least one light source.

Furthermore, the transparent sleeve and the elastic support component are rubber members or plastic members.

Furthermore, the light-emitting assembly further includes a double-sided adhesive layer, the double-sided adhesive layers is adhered to an outer side surface of the transparent sleeve facing away from the at least one light source.

The present disclosure further provides a second embodiment of the light-emitting assembly, including a transparent sleeve, an elastic support component, a light strip, and at least one pressing plate. An accommodating cavity is defined in the transparent sleeve; the elastic support component is located in the accommodating cavity. The light strip is located in the accommodating cavity, the light strip includes a circuit board and at least one light source, the elastic support component is disposed on a first side of the circuit board in a thickness direction of the circuit board for supporting the circuit board, and the at least one light source is disposed on a second side of the circuit board facing away from the elastic support component; the at least one pressing plate is assembled in the accommodating cavity and is pressed against the second side of the circuit board facing away from the elastic support component, and orthographic projections of the at least one pressing plate and the at least one light source on the elastic support component do not overlap.

Furthermore, two pressing plates are provided, the two pressing plates are spaced apart in a width direction of the circuit board, the at least one light source is located in a gap defined between the two pressing plates.

Furthermore, the at least one pressing plate and the transparent sleeve are integrally formed.

Furthermore, the at least one pressing plate extends to two opposite end surfaces of the circuit board in a length direction of the circuit board.

Furthermore, the transparent sleeve is of a hollow structure having an open end and a closed end, the elastic support component and the light strip are both located in the transparent sleeve, and the circuit board passes through the open end of the transparent sleeve to be electrically connected to a connector.

Furthermore, the transparent sleeve is of a hollow structure having two open ends, the elastic support component and the light strip are both located in the transparent sleeve, and the circuit board passes through the two open ends of the transparent sleeve to be respectively electrically connected to connectors.

Furthermore, the circuit board includes a main body and circuits, and the circuits are disposed on one side or two opposite sides of the main body in the thickness direction of the circuit board.

Furthermore, a cavity wall surface of the accommodating cavity facing the at least one light source is spaced apart from the at least one light source.

Furthermore, the transparent sleeve and the elastic support component are rubber members or plastic members.

Furthermore, the light-emitting assembly further includes a double-sided adhesive layer, the double-sided adhesive layers is adhered to a back surface of the transparent sleeve.

The present disclosure further provides the lighting device, including at least one light-emitting assembly and at least one connector. The at least one light-emitting assembly is the light-emitting assembly as foregoing. The circuit board of the at least one light-emitting device is electrically connected to the at least one connector.

According to the light-emitting assembly and the lighting device having the light-emitting assembly, the elastic support component is disposed on the first side of the circuit board for supporting the circuit board, since the elastic support component has a certain rigidity, in a process of inserting the circuit board into the accommodating cavity defined in the transparent sleeve, the circuit board is not easy to be pulled and bent. Further, even though the circuit board is pulled and bent, a force is mainly applied to the elastic support component, since the elastic support component has a certain elasticity, the elastic support component is capable of automatically restored after being pulled and bent, thereby reducing a risk of damaging the circuit board when there happens to be pulled and bent. In this way, the light strip is not easy to be broken and damaged, products are provided with better reliability, and user experience further becomes better.

DETAILED DESCRIPTION

In order to make above objectives, features, and advantages of the present disclosure more comprehensible, specific embodiments of the present disclosure are described in detail below with reference to accompanying drawings. Numerous specific details are set forth in following description to facilitate a sufficient understanding of the present disclosure. However, the present disclosure may be implemented in many other ways different from that described herein, and those who skilled in the art may perform similar improvements without departing from the connotation of the present disclosure, and therefore, the present disclosure is not limited by the specific embodiments disclosed below.

Figure 1:
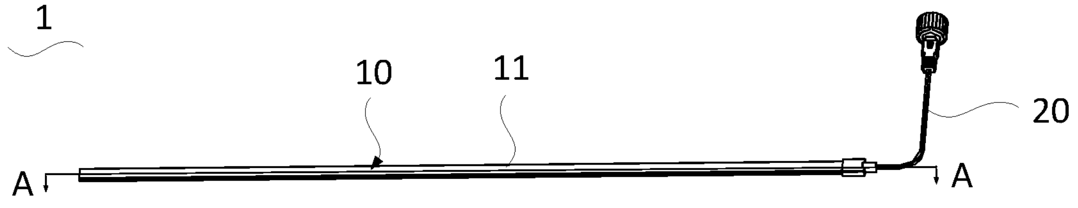
FIG. 1 is a structural schematic diagram of a lighting device according to one embodiment of the present disclosure.
Figure 2:
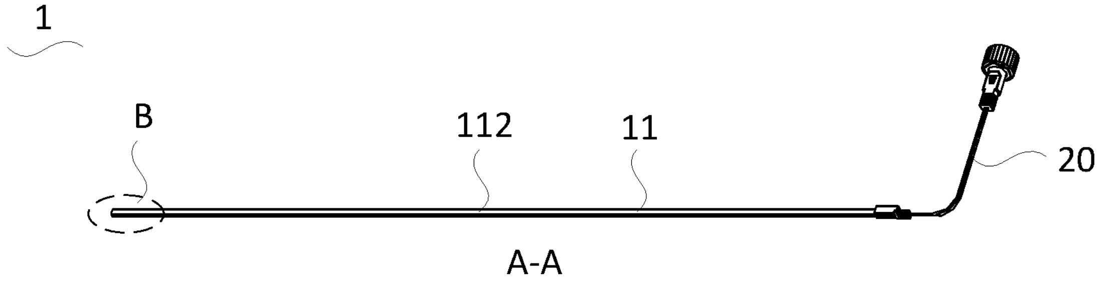
FIG. 2 is a cross-sectional schematic diagram of the lighting device taken along line A-A shown in FIG. 1.
Figure 3:
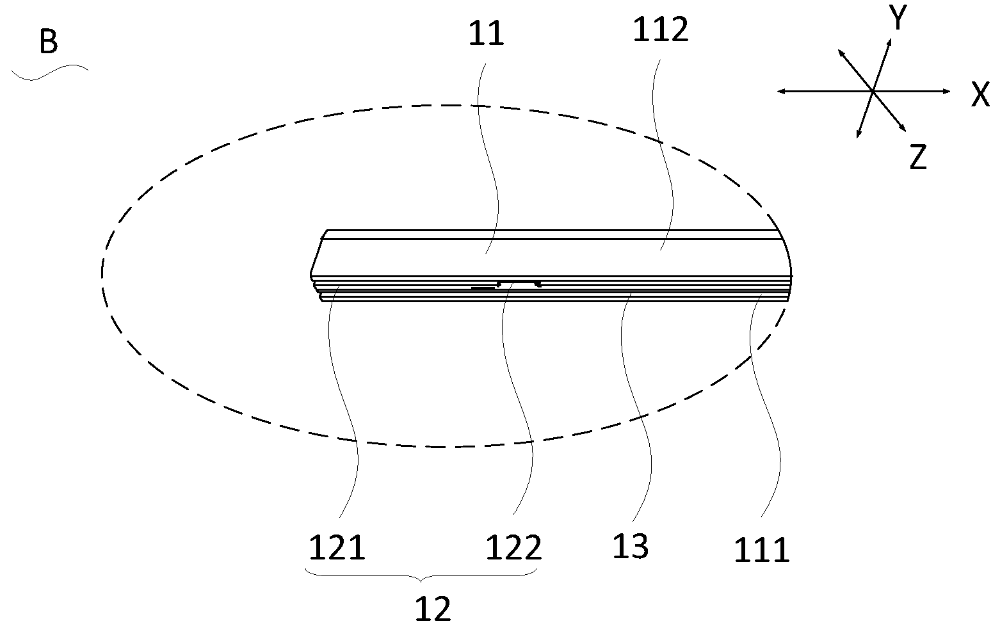
FIG. 3 is an enlarged schematic diagram of portion B shown in FIG. 2.

Please refer to FIGS. 1-3, the present disclosure provides a lighting device 1, the lighting device 1 includes at least one light-emitting assembly 10 and at least one connector 20. The at least one lighting-emitting assembly 10 includes a light strip 12, the light strip 12 includes a circuit board 121 and at least one light source 122, the at least one light source 122 is disposed on the circuit board 121, and the circuit board 121 of the at least one light-emitting assembly 10 is electrically connected to the at least connector 20.

The lighting device 1 includes at least one light-emitting assembly 10, that is, the lighting device 1 includes one or more light-emitting assemblies 10. For example, the lighting device 1 includes one light-emitting assembly 10, the circuit board 121 of the one light-emitting assembly 10 is electrically connected to an external power supply through the at least one connector 20, so as to supply power to the at least one light source 122 by the external power supply. For another example, the lighting device 1 includes a plurality of light-emitting assemblies 10, all the plurality of the light-emitting assemblies 10 are sequentially arranged along a length direction X of a corresponding circuit board 121 of one of the plurality of the light-emitting assemblies 10, and corresponding circuit boards 121 of every adjacent two of the plurality of the light-emitting assemblies 10 are connected in series through a corresponding connector 20, and in an arrangement direction of the plurality of the light-emitting assemblies 10, a first one or a last one of the plurality of the light-emitting assemblies 10 is further electrically connected to the external power supply through a corresponding connector 20, so that the external power supply supplies power to the at least one light sources 122 of each of the plurality of the light-emitting assemblies 10.

The at least one light-emitting assembly 10 is used for decoration and illumination and is applied to building outer portions, bridges, guardrails, hotels, gardens, etc.

Please further refer to FIGS. 3-5 and 9, the at least one light-emitting assembly 10 includes an elastic support component 13, the light strip 12, and a transparent sleeve 11. An accommodating cavity 111 is defined in the transparent sleeve 11. The elastic support component 13 and the light strip 12 are all located in the accommodating cavity 111. The light strip 12 includes the circuit board 121 and the at least one light source 121, the elastic support component 13 is disposed on a first side of the circuit board 121 in a thickness direction Z of the circuit board 121 for supporting the circuit board 121, and the at least one light source 122 is disposed on a second side of the circuit board 121 facing away from the elastic support component 13.

The transparent sleeve 11 is configured to accommodate the elastic support component 13 and the light strip 12, and is capable of blocking external water vapor, reducing a risk of contact between the light strip 12 and the external water vapor, and prolonging a service life of the light strip 12. The transparent sleeve 11 is made by rubber, silica gel, glass, plastic member, or other transparent materials. Preferably, the transparent sleeve 11 is a rubber member, and the rubber member is convenient to obtain and has better water vapor isolation performance.

The circuit board 121 is of a strip-shaped structure and is made by flexible materials or rigid materials, materials of which may be specifically selected according to needs. The at least one light source 122 is an LED (light emitting diode) lamp, a plurality of light sources 122 are provided on the circuit board 121, and a number of the plurality of the light sources 122 may be set according to needs, such as eighteen, twenty-four, thirty, etc. All of the plurality of the light sources 122 are spaced apart along the length direction X of the circuit board 121.

The elastic support component 13 is made by plastic, rubber, silica gel, or other materials having certain elasticity and rigidity. The elastic support component 13 has elasticity so that the elastic support component 13 is bendable, and the elastic support component 13 is capable of restoring after being bent. Moreover, the elastic support component 13 also has a certain rigidity to better support the light strip 12.

Figure 9:
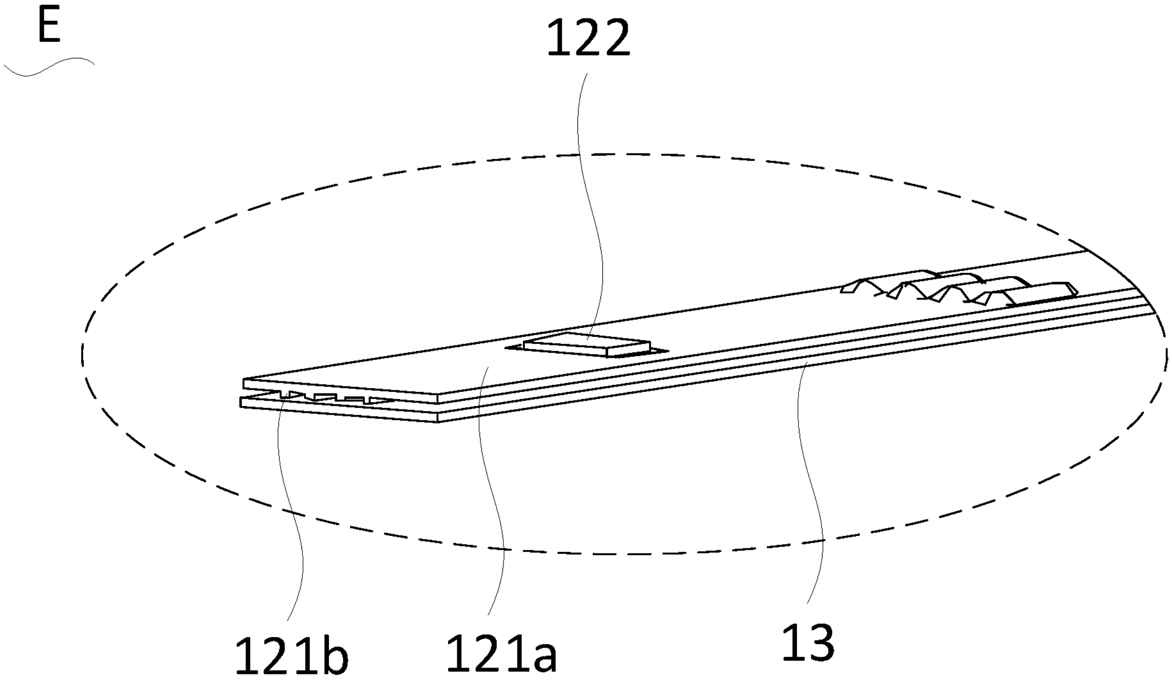
FIG. 9 is an enlarged structural schematic diagram of portion E shown in FIG. 8.
Figure 10:
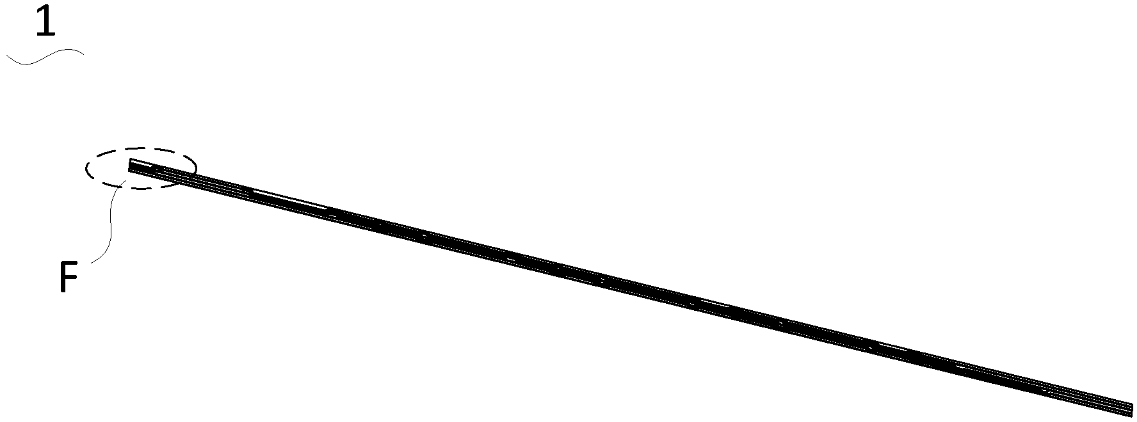
FIG. 10 is a structural schematic diagram of a circuit board according to one embodiment of the present disclosure.
Figure 11:
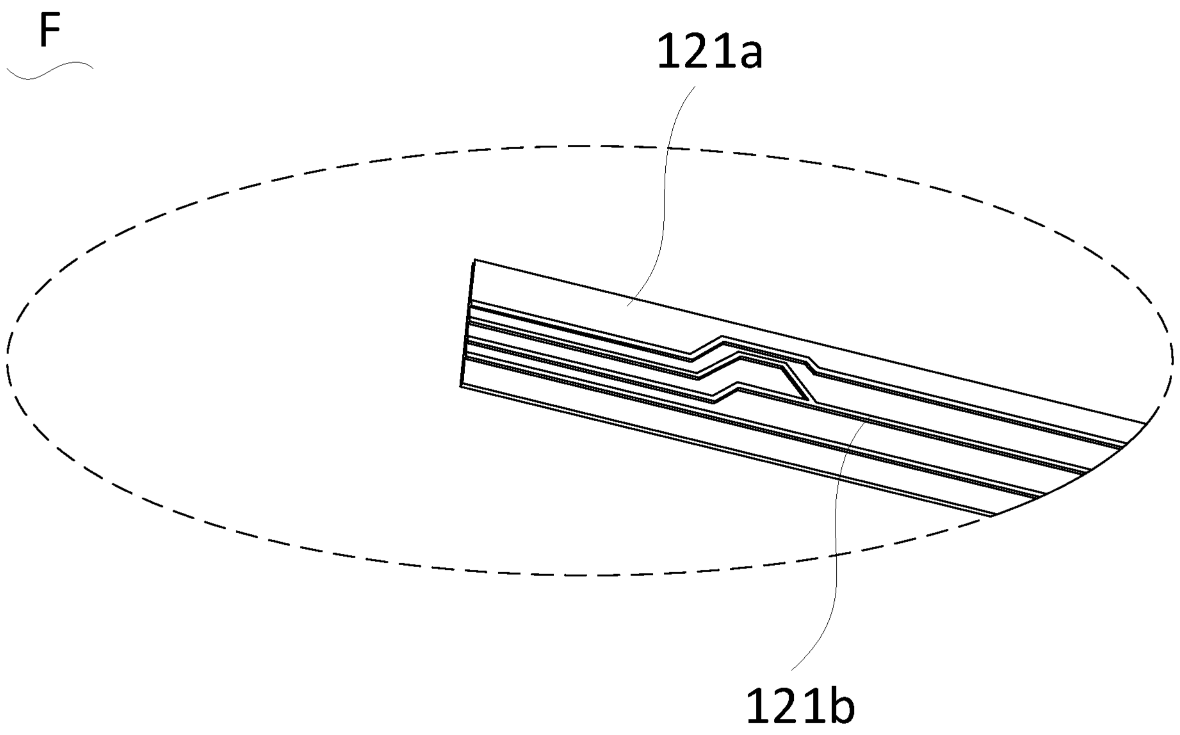
FIG. 11 is an enlarged schematic diagram of portion F shown in FIG. 10.

Taking FIG. 9 for example, the at least one light source 122 is disposed on a top of the circuit board, and the elastic support component 12 is disposed a bottom of the circuit board 121 for supporting the circuit board 121.

When assembling, the at least one light source 122 is first assembled on the second side of the circuit board 121, and then the first side of the circuit board 121 facing away from the at least one light source 122 is supported by the elastic support component 13, and then the at least one light source 122, the circuit board 121, and the elastic support component 13 are integrally inserted into the accommodating cavity 111 defined in the transparent sleeve 11, so that one light-emitting assembly 10 is assembled.

Circuit boards used in conventional light strips are generally flexible circuit boards or rigid circuit boards, which are impossible to process to be long, and therefore, both the flexible circuit boards and the rigid circuit boards are formed by multi-segment splicing. In a process of inserting the conventional light strips into corresponding accommodating cavities of corresponding sleeves, the conventional light strips are pulled, bent, etc., no matter the flexible circuit boards 121 or the rigid circuit boards 121 are pulled, during a pulling process, splicing positions of two adjacent segments are easily broken due to pulling. In addition, for the rigid circuit boards 121, the rigid circuit boards 121 are easy to break when being bent due to poor flexibility.

However, in the present disclosure, the elastic support component 13 is disposed on the first side of the circuit board 121 for supporting the circuit board, since the elastic support component 13 has a certain rigidity, in a process of inserting the circuit board 121 into the accommodating cavity 111 defined in the transparent sleeve 11, the circuit board 121 is not easy to be pulled and bent. Further, even though the circuit board 121 is pulled and bent, a force is mainly applied to the elastic support component 13, since the elastic support component 13 has a certain elasticity, the elastic support component 13 is capable of automatically restored after being pulled and bent, thereby reducing a risk of damaging the circuit board 121 when there happens to be pulled and bent. In this way, the light strip 12 is not easy to be broken and damaged, products are provided with better reliability, and user experience further becomes better.

Figure 4:
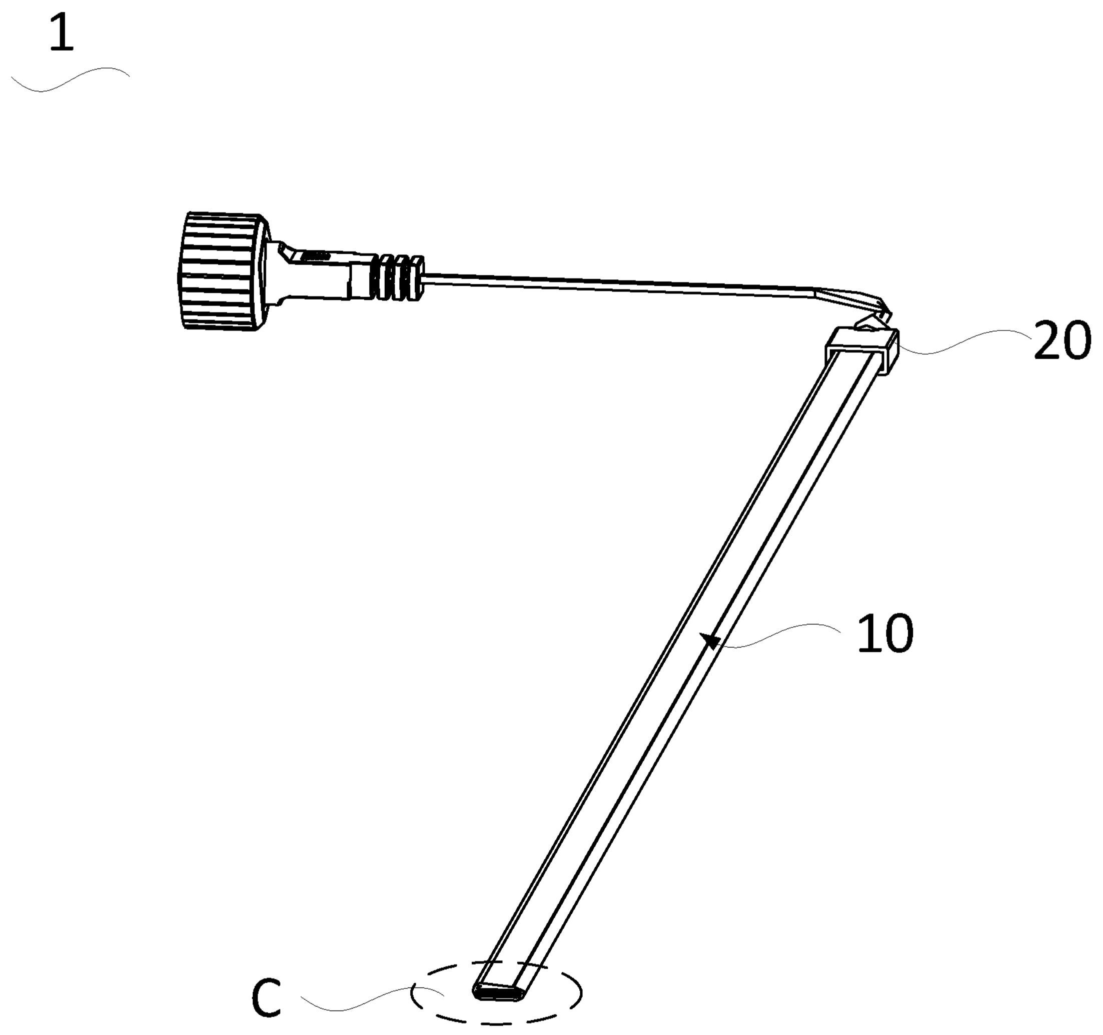
FIG. 4 is a structural schematic diagram of another viewing angle of the lighting device shown in FIG. 1.
Figure 5:
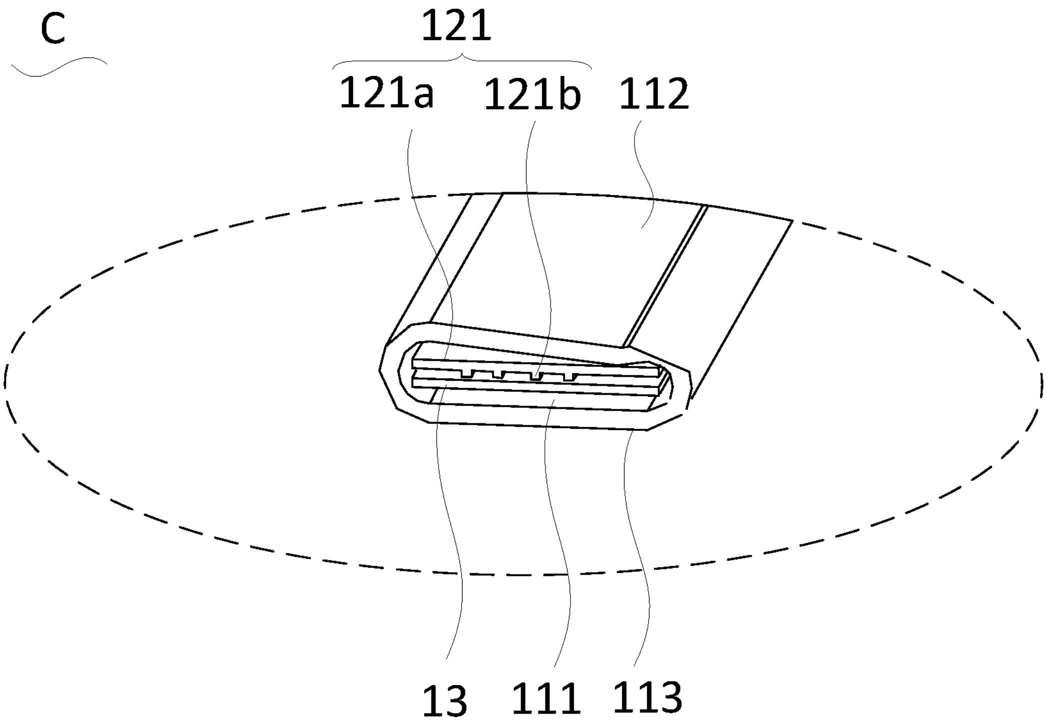
FIG. 5 is an enlarged schematic diagram of portion C shown in FIG. 4.

Please further refer to FIGS. 4-5, in some embodiments of the present disclosure, two sides of the elastic support component 13 in a width direction Y of the circuit board 121 abut against a cavity wall of the accommodating cavity 111. In this way, the light strip 12 and the elastic support component 13 are fixed in the transparent sleeve 11 to reduce a risk of shaking of the light strip 12 and the elastic support component 13 in the transparent sleeve 11, so as to prevent the at least one light source 122 from colliding with the transparent sleeve 11 to be damaged, or prevent the transparent sleeve 11 from being abraded due to friction of the at least one light source 122 to affect a light emitting effect.

Figure 6:
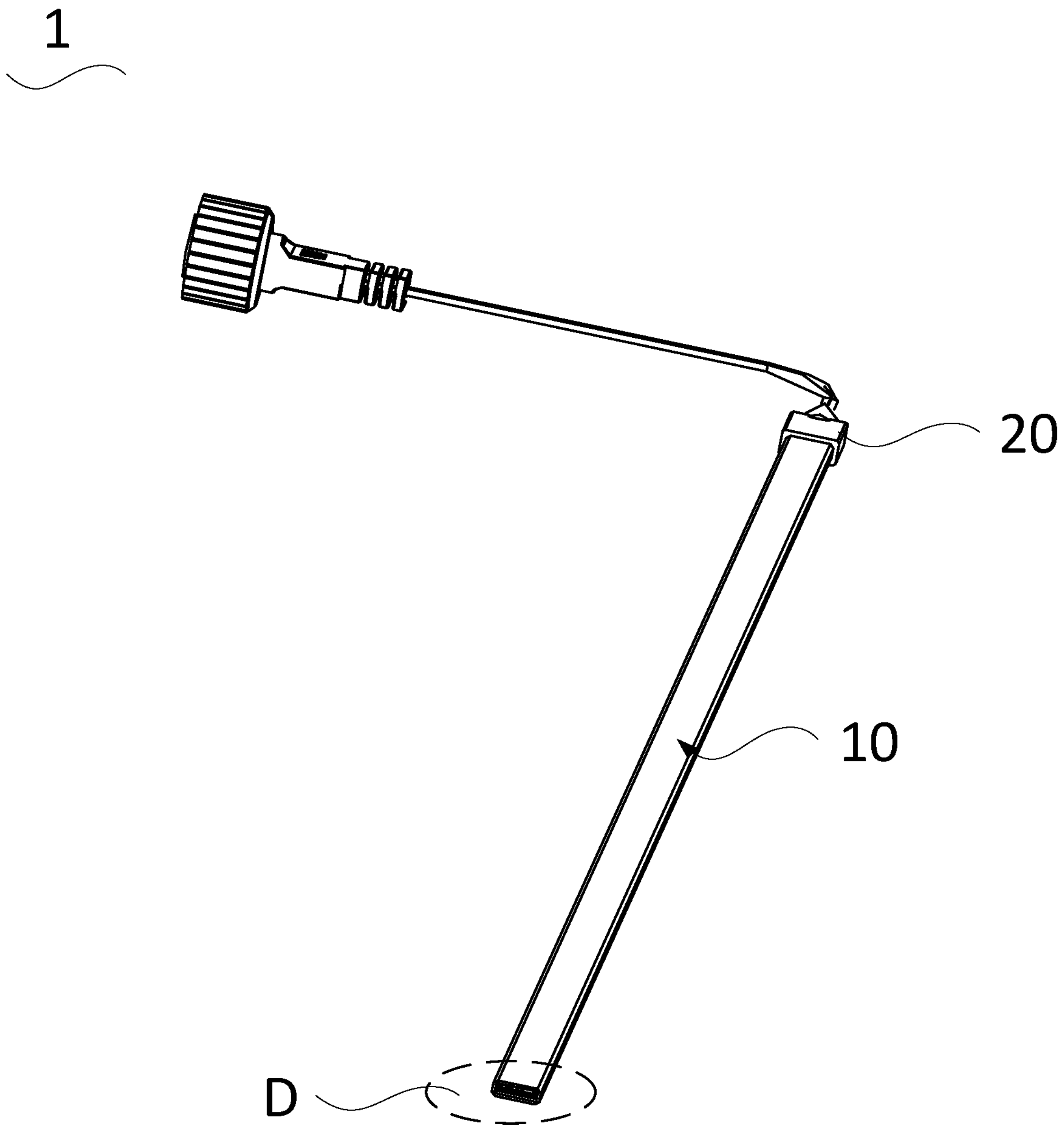
FIG. 6 is a structural schematic diagram of the lighting device according to one embodiment of the present disclosure.
Figure 7:
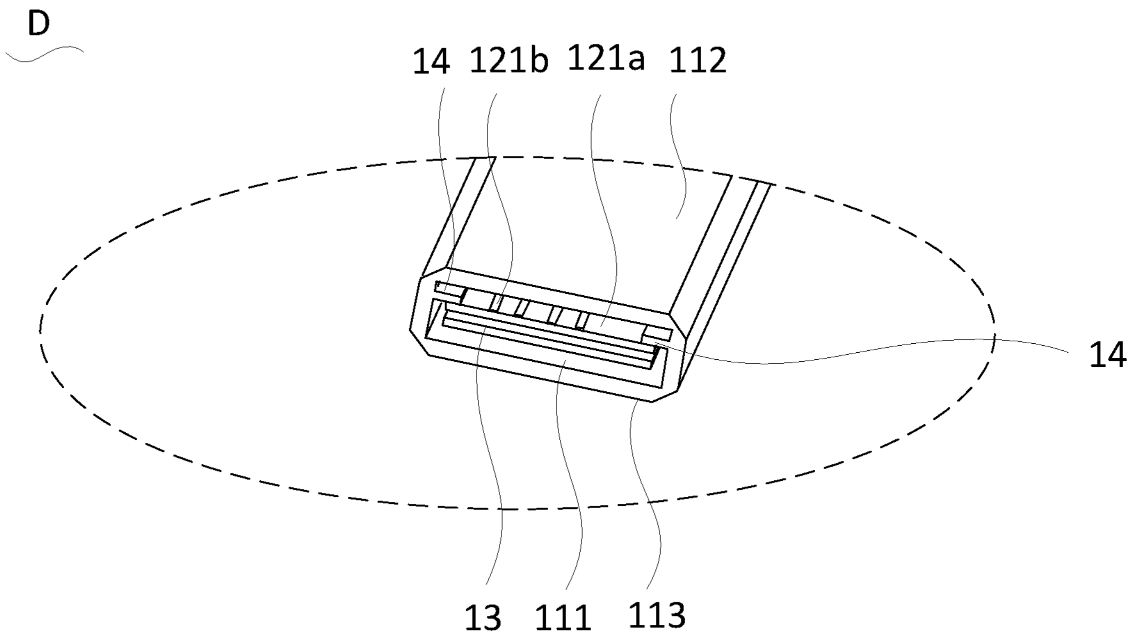
FIG. 7 is an enlarged structural schematic diagram of portion D shown in FIG. 6.
Figure 8:
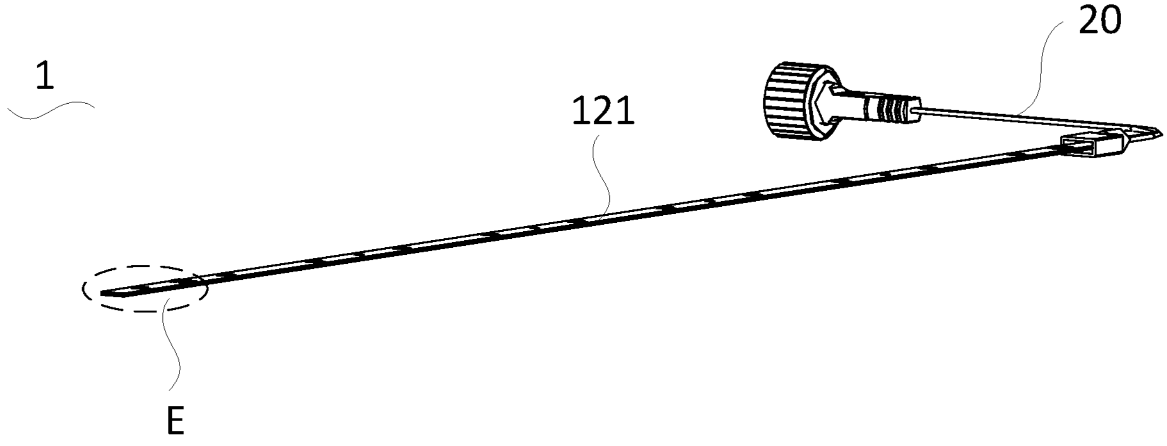
FIG. 8 is a structural schematic diagram of the lighting device removing a transparent sleeve according to one embodiment of the present disclosure.

Please further refer to FIGS. 6 and 7, in some embodiments of the present disclosure, the at least one light-emitting assembly 10 further includes at least one pressing plate 14. The at least one pressing plate 14 is assembled in the accommodating cavity 111 and is pressed against the second side of the circuit board 121 facing away from the elastic support component 13, and orthographic projections of the at least one pressing plate 14 and the at least one light source 122 on the elastic support component 13 do not overlap.

The at least one pressing plate 14 is pressed against the second side of the circuit board 121 facing away from the elastic support component 13 to fix the light strip 12, so as to reduce a risk that the light strip 12 moves in the thickness direction Z of the circuit board 121, prevent the at least one light source 122 from colliding with the transparent sleeve 11 to be damaged, and further prevent the transparent sleeve 11 from being abraded due to the friction of the at least one light source 122 to affect the light emitting effect.

The orthographic projections of the at least one pressing plate 14 and the at least one light source 122 on the elastic support component 13 do not overlap, so that the at least one pressing plate 14 does not shield the at least one light source 122, thereby facilitating the at least one light source 122 to emit lights, and having a better light emitting effect.

Furthermore, in some embodiments, two pressing plates 14 are provided, the two pressing plates 14 are spaced apart in the width direction Y of the circuit board 121, the at least one light source 122 is located in a gap defined between the two pressing plates 14. In this way, on one hand, the two pressing plates 14 do not shield the at least one light source 122 and may not affect the light emitting effect, and on the other hand, the two pressing plates 14 further press the circuit board 121, thereby ensuring stability and reliability of assembly of the light strip 12.

Furthermore, in some embodiments, the at least one pressing plate 14 and the transparent sleeve 11 are integrally formed. Such integrally formed manner is beneficial to reducing manufacturing difficulty of the light-emitting assembly 10, and fasteners for fixing the at least one pressing plate 14 and the transparent sleeve 11 are reduced, and a structure of the light-emitting assembly 10 is simpler.

Certainly, in some other embodiments, the at least one pressing plate 14 and the transparent sleeve 11 are separately formed, and are subsequently connected by bonding or fasteners.

In some embodiments of the present disclosure, the at least one pressing plate 14 extends to two opposite end surfaces of the circuit board 121 in a length direction X of the circuit board 121. In this way, the at least one pressing plate 14 presses the circuit board 121 along the length direction X of the circuit board 121, thereby further improving assembling firmness of the light strip 12.

Please further refer to FIGS. 8-11, in some embodiments of the present disclosure, the circuit board 121 includes a main body 121*a* and circuits 121*b*, and the circuits 121*b* are disposed on one side or two opposite sides of the main body 121*a* in the thickness direction Z of the circuit board 121.

The circuits 112*b* are disposed on one side or two opposite sides of the main body 121*a*, and the at least one light source 122 is disposed on one side of the main body 121*a* and is electrically connected to the circuits 121*b*. For example, the circuits 121*b* are disposed on one side of the main body 121*a*, the at least one light source 122 is connected to the at least one connector 20 in series through the circuits 121*b*; for another example, the circuits 121*b* are disposed on two opposite sides of the main body 121*a*, the at least one light source 122 is connected to the at least one connector 20 in series through the circuits 121*b* on the two opposite sides of the main body 121*a*.

Please further refer to FIGS. 3-7, in some embodiments of the present disclosure, the transparent sleeve 11 is of a hollow structure having an open end and a closed end, the elastic support component 13 and the light strip 12 are both located in the transparent sleeve 11, and the circuit board 121 passes through the open end of the transparent sleeve 11 to be electrically connected to the at least one connector 20.

The light strip 12 and the elastic support component 13 enter and exit the transparent sleeve 11 through the open end of the transparent sleeve 11, so as to facilitate disassembly and assembly of the light strip 12 and the elastic support component 13. In addition, the circuits 121*b* of the circuit board 121 are also electrically connected to the at least one connector 20 through the open end of the transparent sleeve 11.

When the lighting device 1 has one light-emitting assembly 10, the circuits 121*b* of the circuit board 121 of the one light-emitting assembly 10 passes through the open end of the transparent sleeve 11 to be electrically connected to the external power supply through the at least one connector 20.

When the lighting device 1 has the plurality of the light-emitting assemblies 10, one light-emitting assembly 10 including a corresponding transparent sleeve 11 having a corresponding open end and a corresponding closed end serves as the first one or the last one of the plurality of the light-emitting assemblies 10 in the arrangement direction of the plurality of the light-emitting assemblies, and the one light-emitting assembly 10 is electrically connected to the external power supply or other circuits 121*b* of another light-emitting assembly 10 through the corresponding open end of the corresponding transparent sleeve 11.

In foregoing two embodiments, the open end of the transparent sleeve 11 is sealed by the at least one connector 20, and in combination with the closed end of the transparent sleeve 11, the transparent sleeve 11 has a better water vapor isolation effect, which is beneficial to further prolonging the service life of the light strip 12.

In some embodiments of the present disclosure, a plurality of connectors 20 are provided, the transparent sleeve 11 is of a hollow structure having two open ends, the elastic support component 13 and the light strip 12 are both located in the transparent sleeve 11, and the circuit board 121 passes through the two open ends of the transparent sleeve 11 to be respectively electrically connected to the plurality of the connectors 20.

The light strip 12 and the elastic support component 13 are more convenient to enter and exit the transparent sleeve 11 through the two open ends of the transparent sleeve 11. In addition, the circuits 121*b* of the circuit board 121 are also electrically connected to the plurality of the connectors 20 through the two open ends of the transparent sleeve 11.

The transparent sleeve 11 having the two open ends is applied to the lighting device 1 including the plurality of the light-emitting assemblies 10. In the arrangement direction of the plurality of the light-emitting assemblies 10, each of the plurality of the light-emitting assemblies 10 including a corresponding transparent sleeve 11 having corresponding two open ends is located between the first one and last one of the plurality of the light-emitting assemblies 10, and a first end of each of corresponding circuits 121*b* of each of the plurality of the light-emitting assemblies 10 including the corresponding transparent sleeve 11 having the corresponding two open ends is electrically connected to corresponding circuits 121*b* of a previous one of the plurality of the light-emitting assemblies 10 through a corresponding one of the plurality of the connectors 20, and a second end of each of corresponding circuits 121*b* of each of the plurality of the light-emitting assemblies 10 including the corresponding transparent sleeve 11 having the corresponding two open ends is electrically connected to corresponding circuits 121*b* of a next one of the plurality of the light-emitting assemblies 10 through a corresponding one of the plurality of the connectors 20. In this way, the two open ends of the transparent sleeve 11 are both sealed by corresponding connectors, which is beneficial for prolonging the service life of the light strip 12.

In some embodiments of the present disclosure, a cavity wall surface of the accommodating cavity 111 facing the at least one light source 122 is spaced apart from the at least one light source 122.

Specifically, an inner top wall surface of the accommodating cavity 111 is spaced apart from the at least one light source 122.

The cavity wall surface of the accommodating cavity 111 facing the at least one light source 122 is spaced apart from the at least one light source 122, so that the at least one light source 122 does not contact the transparent sleeve 11, thereby reducing a risk that the least one light source 122 collides with the cavity wall surface of the accommodating cavity 111 to be damaged. In addition, possibility that the at least one light source 122 contacts the cavity wall surface of the accommodating cavity 111 to generate friction is reduced, and an out-light surface 112 of the transparent sleeve 11 for the lights to pass through is prevented from being blurred, so that the light-emitting effect of the at least one light-emitting assembly 10 is improved.

It should be mentioned that since the cavity wall surface of the accommodating cavity 111 facing the at least one light source 122 is spaced apart from the at least one light source 122, there is an inner gap between the cavity wall surface of the accommodating cavity 111 and the at least one light source 122, heat generated by the at least one light source 122 due to light emitting is further dissipated through the inner gap, so that the at least one light-emitting assembly 10 has a better heat dissipation effect and a longer service life.

In some embodiments of the present disclosure, the light-emitting assembly 10 further includes a double-sided adhesive layer, the double-sided adhesive layers is adhered to a back surface 113 of the transparent sleeve 11.

The transparent sleeve 11 includes the out-light surface 112 and the back surface 113, and the out-light surface 112 and the back surface 113 are two outer surfaces disposed opposite to each other in the thickness direction Z of the circuit board 121. The lights emitted by the at least one light source 122 pass through the out-light surface 112, and the back surface 113 refers to a surface that the lights do pass through. Taking FIGS. 5 and 7 for example, the out-light surface 112 is an outer top surface of the transparent sleeve 11, the back surface 113 is an outer bottom surface of the transparent sleeve 11, and the double-sided adhesive layers is adhered to the outer bottom surface of the transparent sleeve 11.

Adhering the double-sided adhesive layer is convenient for the light-emitting assembly 10 to fix to a wall surface, a cabinet surface, or other positions, the light-emitting assembly 10 is more conveniently mounted.

According to the light-emitting assembly 10 and the lighting device 1 having the light-emitting assembly 10, the elastic support component 13 is disposed on the first side of the circuit board 121 for supporting the circuit board 121, since the elastic support component 13 has the certain rigidity, in the process of inserting the circuit board 121 into the accommodating cavity 111 defined in the transparent sleeve 11, the circuit board 121 is not easy to be pulled and bent. Further, even though the circuit board 121 is pulled and bent, the force is mainly applied to the elastic support component 13, since the elastic support component 13 has the certain elasticity, the elastic support component 13 is capable of automatically restored after being pulled and bent, thereby reducing the risk of damaging the circuit board 121 when there happens to be pulled and bent. In this way, the light strip 12 is not easy to be broken and damaged, products are provided with better reliability, and the user experience further becomes better.

Various technical features of the above embodiments may be combined in any combination, and all possible combinations of the various technical features of the above embodiments have not been described for a sake of conciseness of description. However, as long as there is no contradiction in the combinations of these technical features, they should all be considered to be within a protection scope of the specification as documented herein.

The above embodiments merely express several embodiments of the present disclosure, and the description thereof is more specific and detailed, but cannot be understood as a limitation on a protection scope of the present disclosure. It should be noted that, for those who skilled in the art, several variations and improvements may be made without departing from a concept of the present disclosure, which are all within the protection scope of the present disclosure. Therefore, the protection scope of the present disclosure shall be subject to the appended claims.

What is claimed is:

1. A light-emitting assembly, comprising:

a transparent sleeve;

an elastic support component; and a light strip;

wherein an accommodating cavity is defined in the transparent sleeve; the elastic support component is located in the accommodating cavity; the light strip is located in the accommodating cavity, the light strip comprises a circuit board and at least one light source, the elastic support component is disposed on a first side of the circuit board in a thickness direction of the circuit board for supporting the circuit board, and the at least one light source is disposed on a second side of the circuit board facing away from the elastic support component;

wherein the elastic support component is an elongated rectangular sheet, wherein the circuit board is of substantially an identical size and shape with the elastic support component;

wherein the transparent sleeve has a substantially rectangular cross-section taken alone a plane perpendicular to a longitudinal axis of the transparent sleeve, wherein a bottom side of the elastic support component is fully fitted with an inner side of the transparent sleeve.

2. The light-emitting assembly according to claim 1, wherein the transparent sleeve is of a hollow structure having an open end and a closed end, the elastic support component and the light strip are both located in the transparent sleeve, and the circuit board passes through the open end of the transparent sleeve to be electrically connected to a connector.

3. The light-emitting assembly according to claim 1, wherein the transparent sleeve is of a hollow structure having two open ends, the elastic support component and the light strip are both located in the transparent sleeve, and the circuit board passes through the two open ends of the transparent sleeve to be respectively electrically connected to connectors.

4. The light-emitting assembly according to claim 1, wherein the circuit board comprises a main body and circuits, and the circuits are disposed on one side or two opposite sides of the main body in the thickness direction of the circuit board.

5. The light-emitting assembly according to claim 1, wherein two sides of the elastic support component in a width direction of the circuit board abut against a cavity wall of the accommodating cavity.

6. The light-emitting assembly according to claim 1, wherein a cavity wall surface of the accommodating cavity facing the at least one light source is spaced apart from the at least one light source.

7. The light-emitting assembly according to claim 1, wherein the transparent sleeve and the elastic support component are rubber members or plastic members.

8. The light-emitting assembly according to claim 1, wherein the light-emitting assembly further comprises a double-sided adhesive layer, the double-sided adhesive layers is adhered to an outer side surface of the transparent sleeve facing away from the at least one light source.

9. A light-emitting assembly, comprising:

a transparent sleeve;

an elastic support component;

a light strip; and at least one pressing plate;

wherein an accommodating cavity is defined in the transparent sleeve; the elastic support component is located in the accommodating cavity; the light strip is located in the accommodating cavity, the light strip comprises a circuit board and at least one light source, the elastic support component is disposed on a first side of the circuit board in a thickness direction of the circuit board for supporting the circuit board, and the at least one light source is disposed on a second side of the circuit board facing away from the elastic support component; the at least one pressing plate is assembled in the accommodating cavity and is pressed against the second side of the circuit board facing away from the elastic support component, and orthographic projections of the at least one pressing plate and the at least one light source on the elastic support component do not overlap;

wherein the elastic support component is an elongated rectangular sheet, wherein the circuit board is of substantially an identical size and shape with the elastic support component; wherein the transparent sleeve has a substantially rectangular cross-section taken alone a plane perpendicular to a longitudinal axis of the transparent sleeve, wherein a bottom side of the elastic support component is fully fitted with an inner side of the transparent sleeve.

10. The light-emitting assembly according to claim 9, wherein two pressing plates are provided, the two pressing plates are spaced apart in a width direction of the circuit board, the at least one light source is located in a gap defined between the two pressing plates.

11. The light-emitting assembly according to claim 9, wherein the at least one pressing plate and the transparent sleeve are integrally formed.

12. The light-emitting assembly according to claim 9, wherein the at least one pressing plate extends to two opposite end surfaces of the circuit board in a length direction of the circuit board.

13. The light-emitting assembly according to claim 9, the transparent sleeve is of a hollow structure having an open end and a closed end, the elastic support component and the light strip are both located in the transparent sleeve, and the circuit board passes through the open end of the transparent sleeve to be electrically connected to a connector.

14. The light-emitting assembly according to claim 9, wherein the transparent sleeve is of a hollow structure having two open ends, the elastic support component and the light strip are both located in the transparent sleeve, and the circuit board passes through the two open ends of the transparent sleeve to be respectively electrically connected to connectors.

15. The light-emitting assembly according to claim 9, wherein the circuit board comprises a main body and circuits, and the circuits are disposed on one side or two opposite sides of the main body in the thickness direction of the circuit board.

16. The light-emitting assembly according to claim 9, wherein a cavity wall surface of the accommodating cavity facing the at least one light source is spaced apart from the at least one light source.

17. The light-emitting assembly according to claim 9, wherein the transparent sleeve and the elastic support component are rubber members or plastic members.

18. The light-emitting assembly according to claim 9, wherein the light-emitting assembly further comprises a double-sided adhesive layer, the double-sided adhesive layers is adhered to a back surface of the transparent sleeve.

19. A lighting device, comprising:

at least one light-emitting device; and at least one connector;

wherein the at least one light-emitting device comprises a transparent sleeve, an elastic support component, and a light strip; an accommodating cavity is defined in the transparent sleeve; the elastic support component is located in the accommodating cavity; the light strip is located in the accommodating cavity, the light strip comprises a circuit board and at least one light source, the elastic support component is disposed on a first side of the circuit board in a thickness direction of the circuit board for supporting the circuit board, and the at least one light source is disposed on a second side of the circuit board facing away from the elastic support component; the circuit board of the light-emitting device is electrically connected to the at least one connector;

wherein the elastic support component is an elongated rectangular sheet, wherein the circuit board is of substantially an identical size and shape with the elastic support component; wherein the transparent sleeve has a substantially rectangular cross-section taken alone a plane perpendicular to a longitudinal axis of the transparent sleeve, wherein a bottom side of the elastic support component is fully fitted with an inner side of the transparent sleeve.

* * * * *